(12) United States Patent
Karasawa

(10) Patent No.: US 6,774,386 B2
(45) Date of Patent: Aug. 10, 2004

(54) IMAGE INFORMATION READ-OUT APPARATUS

(75) Inventor: Hiroyuki Karasawa, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 287 days.

(21) Appl. No.: 09/986,197

(22) Filed: Nov. 7, 2001

(65) Prior Publication Data

US 2002/0053648 A1 May 9, 2002

(30) Foreign Application Priority Data

Nov. 7, 2000 (JP) ........................................ 2000-338689

(51) Int. Cl.[7] .............................................. G03B 42/08
(52) U.S. Cl. ........................................ 250/586; 250/582
(58) Field of Search ................................ 250/581, 582, 250/583, 584, 585, 586, 589, 484.4

(56) References Cited

U.S. PATENT DOCUMENTS

| | | | |
|---|---|---|---|
| 4,816,679 A | 3/1989 | Sunagawa et al. | |
| 4,922,103 A | 5/1990 | Kawajiri et al. | |
| 4,953,038 A | * 8/1990 | Schiebel et al. | ............ 358/471 |
| 2001/0011714 A1 | * 8/2001 | Yasuda | ........................ 250/589 |

FOREIGN PATENT DOCUMENTS

| | | | |
|---|---|---|---|
| JP | 60-111568 | 6/1985 | ............. H04N/1/04 |
| JP | 60-236354 | 11/1985 | ............. A61B/6/00 |
| JP | 1-101540 | 4/1989 | ............ G03B/42/02 |

* cited by examiner

Primary Examiner—Constantine Hannaher
Assistant Examiner—Timothy J. Moran
(74) Attorney, Agent, or Firm—Sughrue Mion, PLLC

(57) ABSTRACT

An image read-out apparatus includes a reading light projecting system which projects a line reading light beam onto a image-bearing medium, and an image-bearing light detecting system having a line sensor which receives image-bearing light emitted from the portion exposed to the line reading beam and converts the amount of image-bearing light to an electric signal. The image-bearing light detecting system includes an erecting unit optical system which focuses the image-bearing light on the line sensor and an optical element array formed by a plurality of first and second optical elements which are alternately arranged along the erecting unit optical system and lead the image-bearing light passing through the erecting unit optical system in different directions. The line sensor has a first sensor which receives light led by the first optical elements and a second sensor which receives light led by the second optical elements.

12 Claims, 15 Drawing Sheets

F I G . 7
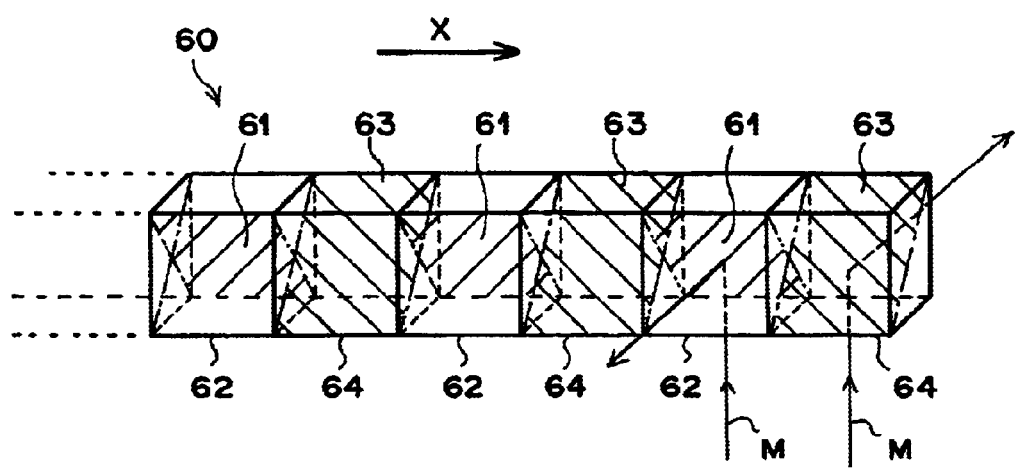

F I G . 9
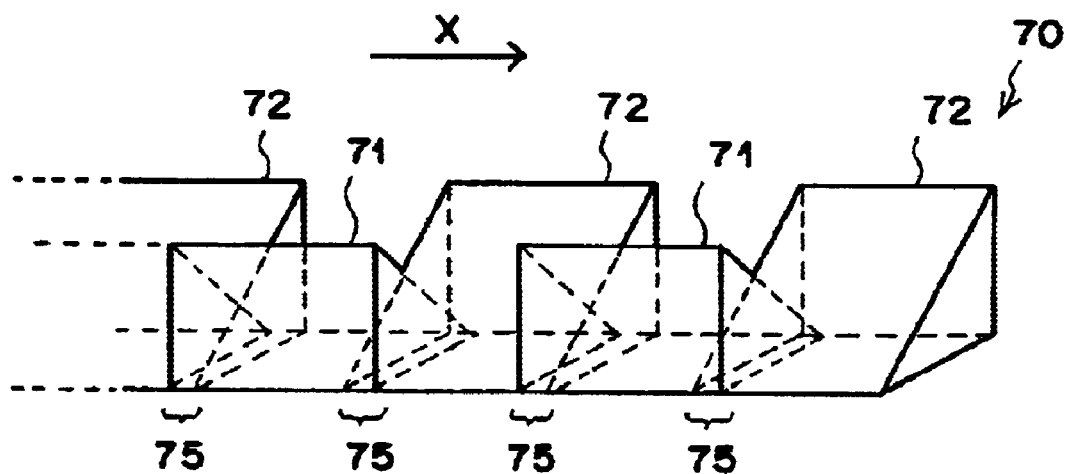

F I G . 10
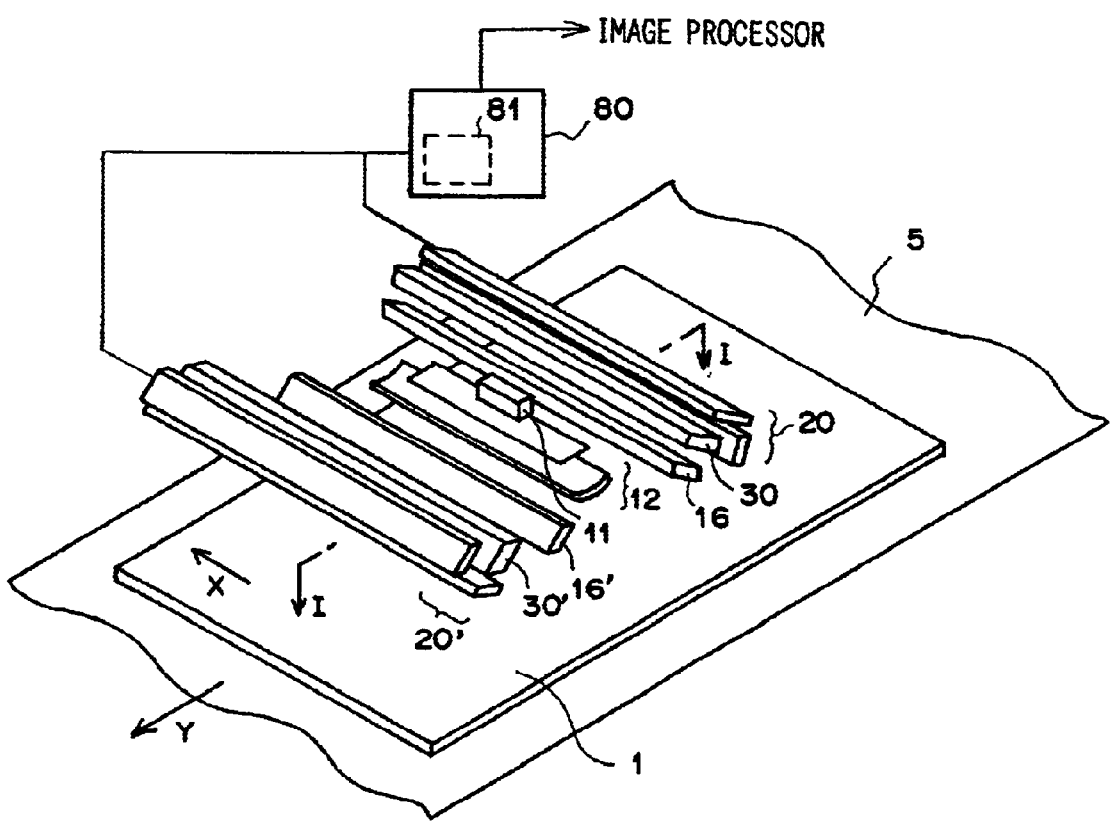

F I G .12
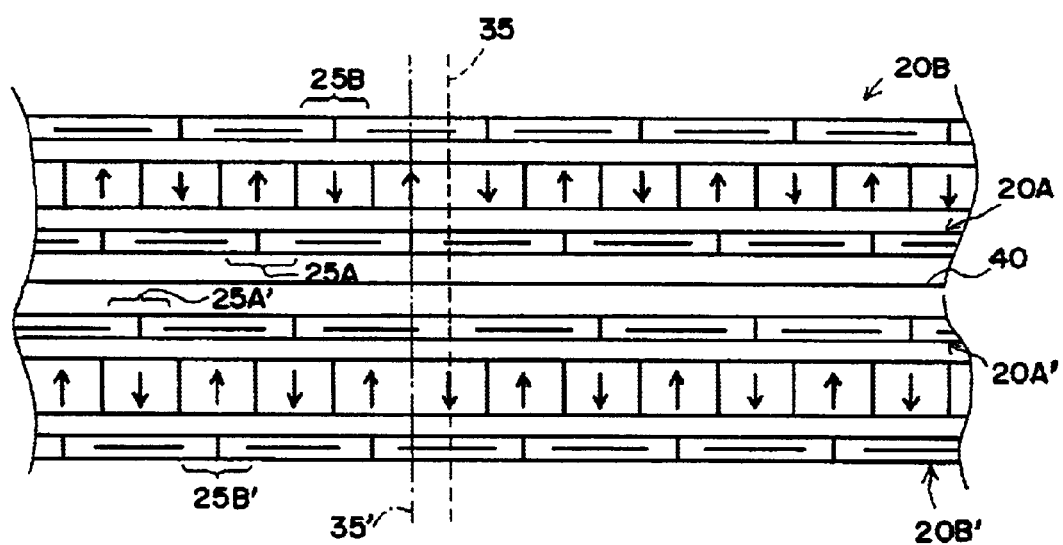

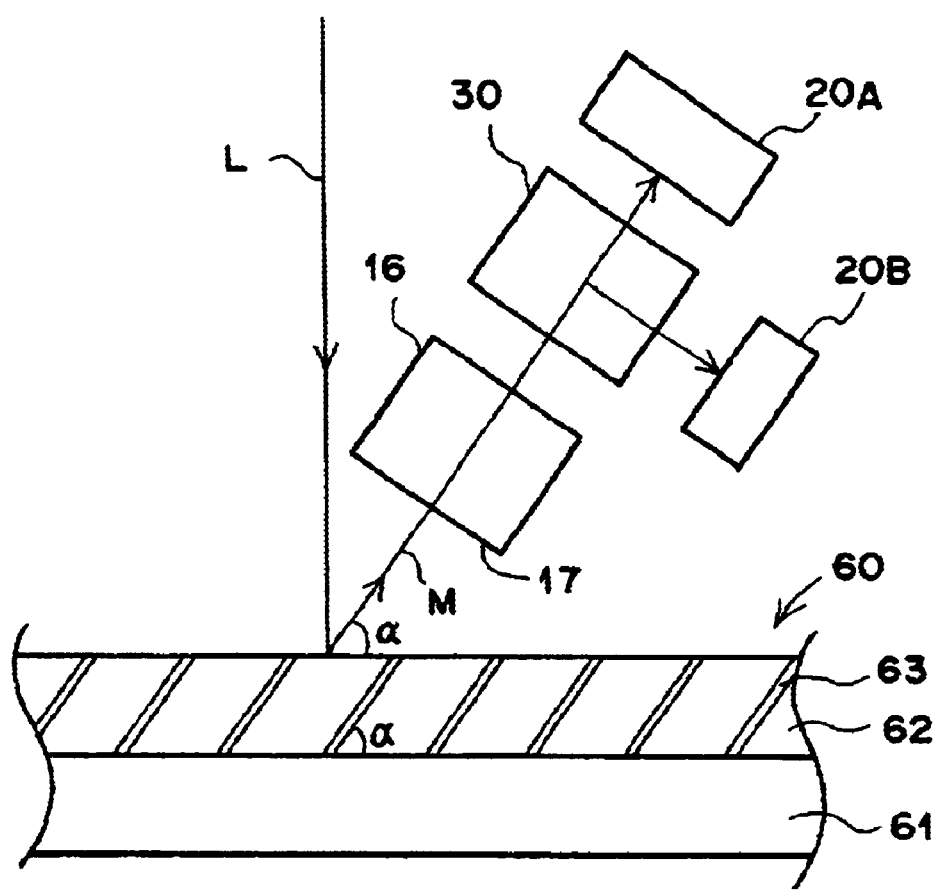
F I G . 13

IMAGE INFORMATION READ-OUT APPARATUS

BACKGROUND OF THE INVENTION

1. Field of the Invention

This invention relates to an image information read-out apparatus, and more particularly to an image information read-out apparatus in which reading light is projected in a line onto an image-bearing medium bearing thereon an image and image-bearing light bearing thereon the image on the image-bearing medium and emitted from the recording medium upon exposure to the reading light is read out by a line sensor.

2. Description of the Related Art

When certain kinds of phosphor are exposed to a radiation, they store a part of energy of the radiation. Then when the phosphor which has been exposed to the radiation is exposed to stimulating rays such as visible light or a laser beam, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been put into wide use as a computed radiography a radiation image recording and reproducing system using a stimulable phosphor sheet (a sheet provided with a layer of the stimulable phosphor).

In the radiation image recording and reproducing system, a stimulable phosphor sheet is exposed to a radiation passing through an object such as a human body to have a radiation image information of the object stored on the stimulable phosphor sheet, a stimulating light beam such as a laser beam is caused to two-dimensionally scan the stimulable phosphor sheet, thereby causing each part of the stimulable phosphor sheet exposed to the stimulating light beam to emit the stimulated emission, the stimulated emission is photoelectrically detected, thereby obtaining an image signal (a radiation image signal) representing the radiation image information, the radiation image signal thus obtained is subjected to image processing such as gradation processing and/or frequency processing and a radiation image of the object is reproduced as a visible image for diagnosis on the basis of the processed radiation image signal on a recording medium such as a photographic film or a display such as a CRT.

In the radiation image information read-out apparatus employed in the radiation image recording and reproducing apparatus, it has been proposed to use a line light source which projects a line beam onto the stimulable phosphor sheet as a stimulating light source and to use a line sensor having an array of photoelectric convertor elements extending in the main scanning direction (the longitudinal direction of the line beam) as a means for photoelectrically reading out the stimulated emission. The line beam and the line sensor are moved relative to the stimulable phosphor sheet in the sub-scanning direction (the direction perpendicular to the longitudinal direction of the line beam) by a scanning means. By the use of a line beam and a line sensor, the reading time is shortened, the overall size of the apparatus can be reduced and the cost can be reduced. See, for instance, Japanese Unexamined Patent Publication Nos. 60 (1985)-111568, 60 (1985)-236354, and 1 (1989)-101540. In such a radiation image information read-out apparatus, the line sensor is positioned close to the stimulable phosphor sheet and an erecting unit optical system is provided between the line sensor and the stimulable phosphor sheet in order to collect the stimulated emission on the light receiving face of the line sensor.

Also when the stimulating light source is a point scan type light projecting means which causes a light beam to scan the stimulable phosphor sheet, a line sensor is sometimes employed as the photoelectric read-out means.

The length of the line sensor should be equivalent to the width of the stimulable phosphor sheet which is generally 35 cm to 43 cm. Since the sensor chips commercially available at present is from several tens mm to about 100 mm in length, a line sensor formed by arranging a plurality of sensor chips in a row has been employed in the radiation image information read-out apparatus. Since each of the sensor chips is packaged, the parts between adjacent sensor chips form dead zones (noneffective zones) where the stimulated emission cannot be detected. Accordingly, stimulated emission which impinges upon the noneffective zones of the line sensor cannot be detected, which generates artifact in images obtained.

This problem may be overcome by arranging a plurality of combinations of a line sensor (having noneffective zones) and an erecting unit optical system in parallel to the longitudinal direction of the line beam. However this approach is disadvantageous in that one or more additional erecting unit optical system is required, which adds to the cost, and even with such a structure, the noneffective zones of the respective line sensors make it difficult to uniform the light receiving condition over the entire length of the line beam.

In the field of biochemistry and the molecular biology, there has been known a fluorescence detecting system in which detection of the gene sequence, the gene expression level, and the pathway and/or condition of metabolism, absorption and excretion of material administered to a mouse; and separation, identification, and evaluation of molecular weight and properties of protein can be carried out by reading out image information on a sample in which a specific organism-derived material labeled with fluorescent pigment is distributed. In the fluorescence detecting system, for example, a gel support on which a specific DNA fraction (an organism-derived material) labeled with fluorescent pigment is distributed is obtained, exciting light which excites the fluorescent pigment is projected onto the gel support, fluorescence emitted from the gel support is photoelectrically read, thereby obtaining image information representing the distribution of the DNA fraction labeled with the fluorescent pigment, and the distribution of the DNA fraction is displayed on, for instance, a CRT display on the basis of the image information thus obtained.

Also in this fluorescence detecting system, there has been proposed an arrangement which comprises a stimulating (exciting) light source, a line sensor and a sub-scanning means similar to those employed in the aforesaid radiation image information read-out apparatus. Also in the fluorescence detecting system of this arrangement, there are involved problems described above in conjunction with the radiation image information read-out apparatus.

SUMMARY OF THE INVENTION

In view of the foregoing observations and description, the primary object of the present invention is to provide an image information read-out apparatus which employs a line sensor formed of a plurality of sensor chips and can nevertheless read an image free from artifact due to the noneffective zones between sensor chips.

In accordance with the present invention, there is provided an image read-out apparatus comprising a reading light projecting means which projects reading light in a line-like pattern extending in a main scanning direction onto an image-bearing medium bearing thereon image information, an image-bearing light detecting means having a line sensor which extends along the line-like portion of the image-bearing medium exposed to the reading light to receive image-bearing light emitted from the portion exposed to the reading light and converts the amount of image-bearing light to an electric signal, and a sub-scanning means which moves one of the image-bearing light detecting means and the image-bearing medium relatively to each other in a sub-scanning direction intersecting the main scanning direction, wherein the improvement comprises that the image-bearing light detecting means further comprises an erecting unit optical system which is disposed along the portion of the image-bearing medium exposed to the reading and focuses the image-bearing light on the line sensor and an optical element array formed by a plurality of first and second optical elements which are alternately arranged along the erecting unit optical system and lead the image-bearing light passing through the erecting unit optical system in different directions, and said line sensor comprises a first sensor which receives light led by the first optical elements and a second sensor which receives light led by the second optical elements.

The image-bearing light is light which is emitted from the portion of the image-bearing medium exposed to the reading light and bears thereon a part of the image born by the portion of the image-bearing medium. The image-bearing light emitted from the portion of the image-bearing medium exposed to the reading light may be any of light reflected at the portion, light passing through the portion and light generated by the portion so long as it bears the image born by the portion of the image-bearing medium exposed to the reading light.

The reading light projecting means may be either of a point scan type which causes a point light beam to scan the image-bearing medium in a line in the main scanning direction or of a line irradiation type which projects a line light beam extending in the main scanning direction onto the image-bearing medium. That is, the portion of the image-bearing medium exposed to the reading light is the portion scanned by the point light beam in the former case, and the portion exposed to the line light beam at one time in the latter case.

When the image-bearing medium is a stimulable phosphor sheet, the image-bearing light is the stimulated emission. That is, the image information read-out apparatus of this invention can be employed as a radiation image information read-out apparatus for said computed radiography.

It is preferred that the stimulable phosphor sheet be anisotropic and radiates the stimulated emission in a direction at a predetermined angle to the direction of thickness of the stimulable phosphor sheet. In this case, it is preferred that the image-bearing light (stimulated emission) detecting system be arranged so that the stimulated emission incident face of the erecting unit optical system is positioned in perpendicular to the direction at the predetermined angle to the direction of thickness of the stimulable phosphor sheet.

The image-bearing medium may be a medium bearing thereon a fluorescent material image. In this case, the image-bearing light is fluorescence. That is, in this case, the image read-out apparatus of the invention may be used as an image read-out apparatus for the aforesaid fluorescence detecting system.

The medium bearing thereon a fluorescent material image is, for instance, a gel support on which a specific DNA fraction (an organism-derived material) labeled with fluorescent pigment is distributed, and the expression "bearing thereon a fluorescent material image" should be broadly interpreted to include both a case where the medium bears thereon an image of the sample labeled with fluorescent pigment and a case where enzyme is bonded with the labeled sample, the enzyme is brought into contact with a fluorescent substrate to change the substrate into a fluorescent material which emits fluorescence, and the medium bears an image of the fluorescent material thus obtained.

Combinations of fluorescent pigment which is used for forming a labeled sample image on a medium and a wavelength of the reading light (exciting or stimulating light) for causing the pigment to emit fluorescence are as follows. When the reading light is a laser beam of 470 nm or 480 nm, the fluorescent pigment may be any so long as it can be excited by a laser beam at the wavelength. For example, Fluorescein (C.I. No. 45350), Fluorescein-X represented by the following structural formula (1), YoYo-1 represented by the following structural formula (2), ToTO-1 represented by the following structural formula (3), Yo-Pro-1 represented by the following structural formula (4), Cy-3® represented by the following structural formula (5), Nile Red represented by the following structural formula (6), BCECF represented by the following structural formula (7), Rohdamine 6G (C. I. No. 45160), Acridine Orange (C.I. No. 46005), SYBR Green ($C_2H_6OS$), Quantum Red, R-Phycoerythrin, Red 613, Red 670, Fluor X, Fluorescein-labeled amidite, FAM, AttoPhos, Bodipy phosphatidylcholine, SNAFL, Calcium Green, Fura Red, Fluo 3, AllPro, NBD phosphoethanolamine, and the like may be preferably employed. When the reading light is a laser beam of 633 nm or 635 nm, the fluorescent pigment may be any so long as it can be excited by a laser beam at the wavelength. For example, Cy-5® represented by the following structural formula (8) and Allphycocyanin may be preferably employed. When the reading light is a laser beam of 530 nm or 540 nm, the fluorescent pigment may be any so long as it can be excited by a laser beam at the wavelength. For example, Cy-3® represented by the following structural formula (5), Rohdamine 6G (C. I. No. 45160), Rohdamine B (C.I. No. 45170), Ethidium Bromide represented by the following structural formula (9), Texas Red represented by the following structural formula (10), Propidium Iodide represented by the following structural formula (11), POP-3 represented by the following structural formula (12), Red 613, Red 670, Cardoxyrohdamine (R6G), R-Phycoerythrin, Quantum Red, JOE, HEX, Ethidium homodimer, Lissamine rhodamine B peptide and the like may be preferably employed.

Structural Formula (1)~(12)
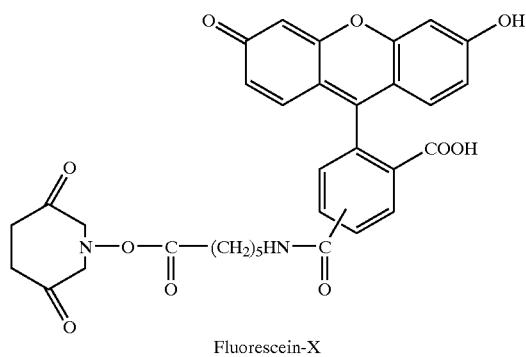
Fluorescein-X (1)
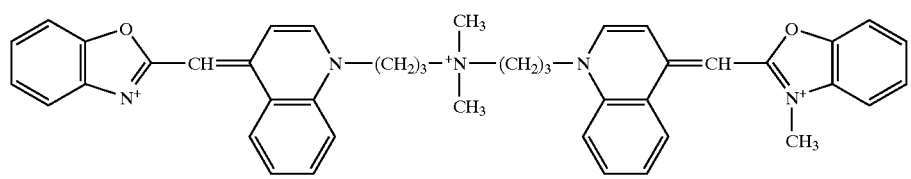
YOYO-1 (2)
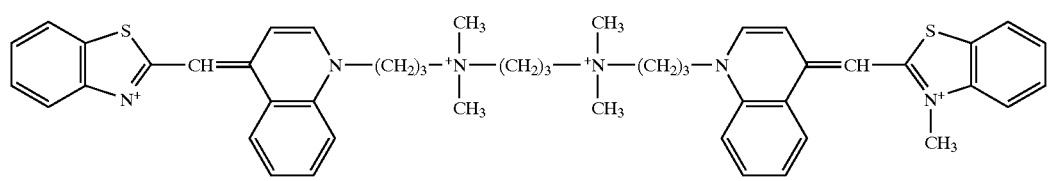
TOTO-1 (3)
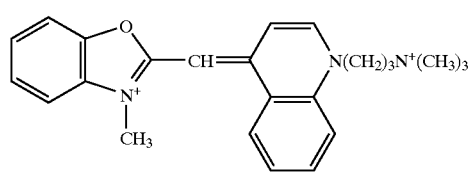
YO-PRO-1 (4)
Cy-3 (5)
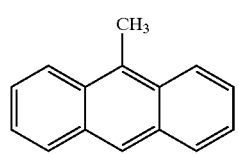
Nile Red (6)
BCECF (7)

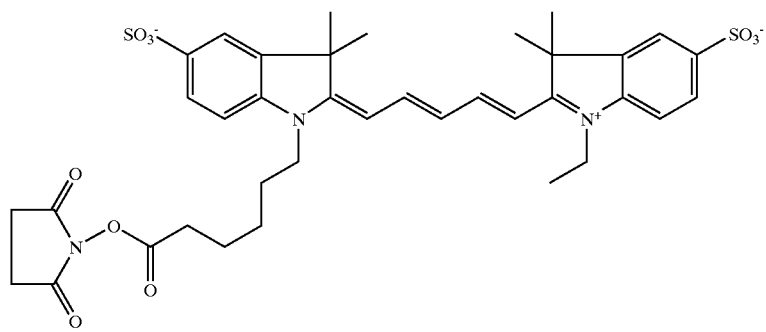

Cy-5

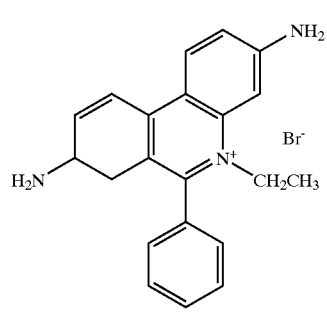

Ethidium Bromide

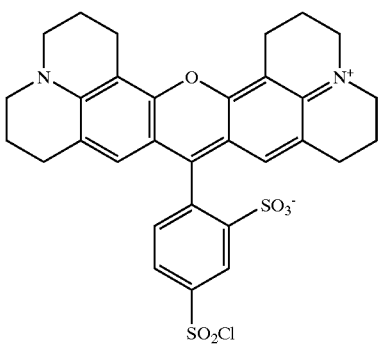

Texas-Red

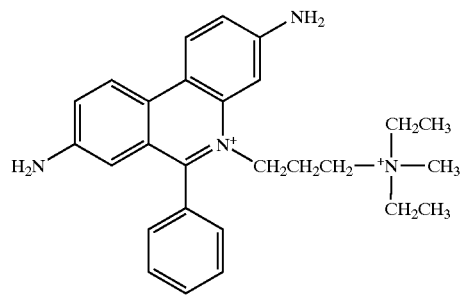

Propidium Iodide

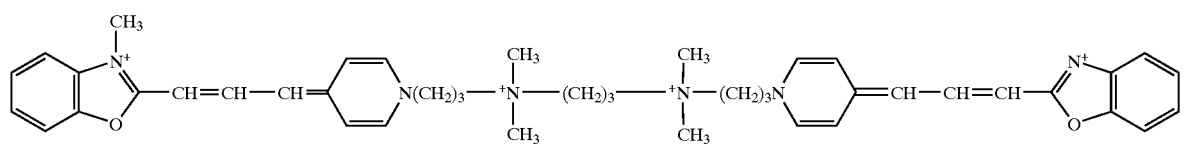

POPO-3

For example, the reading light projecting means may be a line irradiation type light beam projecting means comprising a combination of a slit and a fluorescent lamp or a cold cathode fluorescent lamp or a combination of an optical system such as a cylindrical lens and a light source such as an LED array, an LD array or a broad area laser as well as a point scan type light beam projecting means comprising a light source such as an LED and a light beam scanning optical system such as a polygonal mirror.

It is possible to provide a plurality of reading light projecting means which emit light of different wavelengths so that one of the reading light projecting means is selectively employed according to the kind of image-bearing medium to be used.

It is preferred that the length of the portion of the image-bearing medium exposed to the reading light in the main scanning direction be not smaller than the width of the image-bearing medium.

The erecting unit optical system may be, for instance, a refractive index profile type lens array such as a SELFOC® lens array or a rod lens array, which is formed by an imaging system where the object plane and the image plane are in one to one correspondence, a cylindrical lens, a biaxial lens, an aspheric lens array (see, Japanese Unexamined Patent Publication No. 6 (1994)-208081) a slit or fiber optics.

The reading light projecting means and the image-bearing light detecting means may be disposed either on the same side of the image-bearing medium sheet or on opposite sides of the sheet. However, in the latter case, the support sheet and the like of the image-bearing medium sheet should be permeable to the image-bearing light.

When each of the first and second sensors is provided with effective areas, where the sensor can detect light, and noneffective areas, where the sensor cannot detect light, which are alternately arranged in the main scanning direction, for example, the part of the image-bearing light led by the first optical elements is caused to impinge upon the effective areas of the first sensor and the part of the image-bearing light led by the second optical elements is caused to impinge upon the effective areas of the second sensor.

When each of the first and second sensors comprises a plurality of sensor chips, each comprising a plurality of photoelectric convertor elements linearly arranged in a row, arranged end to end, the central areas of the respective sensor chips where the photoelectric convertor elements exist are the effective areas and the end portions of the respective sensor chips where no photoelectric convertor element exists are the noneffective areas.

In the image information read-out apparatus of the present invention, it is preferred that the first and second sensors are disposed so that the effective areas of the first and second sensors overlap each other in the main scanning direction at portions corresponding to boundaries between the first and second optical elements of the optical element array and there is provided pixel signal adder means which adds up pixel by pixel outputs of the first and second sensors for each pixel in the portions corresponding to boundaries between the first and second optical elements of the optical element array. The boundary between the first and second optical elements of the optical element array as said here need not necessarily have only one pixel width in the main scanning but may have a multiple pixel width. That is, the boundary may be represented by a plurality of pixels near to pixels which form an exact boundary.

The optical element array may be formed by either first and second optical elements one of which transmits the image-bearing light and the other of which reflects the same, or first and second optical elements which reflect the image-bearing light in different directions.

It is preferred that the optical element array itself has a function of cutting the reading light. For example, this may be realized by forming the optical element array itself of a material which absorbs light at the wavelength of the reading light or by disposing an interference filter, which transmits the image-bearing light but does not transmit the reading light, in front of the light incident face of the optical element array.

When the first and second optical elements are arranged to reflect the image-bearing light in different directions, the optical element array may be given a function of cutting the reading light by forming the reflecting surfaces of the first and second optical elements by dichroic mirrors which reflect the image-bearing light but transmit the reading light.

A reading light cut filter which transmits the image-bearing light but does not transmit the reading light (e.g., a sharp cut filter or a bandpass filter) maybe provided between the image-bearing medium and the line sensor.

The image information read-out apparatus of the present invention may be provided with a plurality of sets of image-bearing light detecting means. In this case, it is preferred that the optical element arrays be arranged so that the boundaries between first and second optical elements are positioned in different positions, image-bearing light detecting means by image-bearing light detecting means as seen in the main scanning direction.

In the image information read-out apparatus of the present invention where the image-bearing light detecting means has an optical element array formed by a plurality of first and second optical elements which are alternately arranged and lead light in different directions, and first and second sensors which receive light led by the first and second optical elements, the image-bearing light emitted from the part of the image-bearing medium exposed to the reading light is uniformly detected by the line sensor over the entire width of the image-bearing medium.

Even if each sensor has effective areas and noneffective areas alternately arranged in the main scanning direction, when such an optical element array and a pair of sensors are employed, the image-bearing light emitted from portions corresponding to noneffective areas of one of the sensors can be detected by the effective areas of the other sensor, whereby the image-bearing light entering the erecting unit optical system can be uniformly detected over the entire width of the image-bearing medium, and at the same time, generation of artifact can be suppressed as compared with when only one set of stimulated emission detecting means is employed.

When the first and second sensors are disposed so that the effective areas of the first and second sensors overlap each other in the main scanning direction at portions corresponding to boundaries between the first and second optical elements of the optical element array and there is provided pixel signal adder means which adds up pixel by pixel outputs of the first and second sensors for each pixel in the portions corresponding to boundaries between the first and second optical elements of the optical element array, even if the image-bearing light from the portions of the image-bearing medium corresponding to the boundaries is detected partly by the first sensor and partly by the second sensor, the whole image-bearing light from the portions can be detected under substantially the same condition as other portions by adding the outputs of the first and second sensors, whereby discontinuity of the data at boundaries of the optical elements can be detected and a smooth image suppressed with artifact can be obtained.

When the optical element array itself has a function of cutting the reading light, the reading light can be prevented from impinging upon the line sensor without additionally providing a reading light cut filter.

Further when a plurality of sets of image-bearing light detecting means are provided, light collecting efficiency is enhanced and an image higher in S/N can be obtained, whereby, for instance, image diagnosis can be performed at a higher reliability.

Further, when a stimulable phosphor sheet which is anisotropic and radiates the stimulated emission in a direction at a predetermined angle to the direction of thickness of the stimulable phosphor sheet is employed as the image-bearing medium and the stimulated emission detecting means (the image-bearing light detecting means) is arranged so that the stimulated emission incident face of the erecting unit optical system is positioned in perpendicular to the direction at the predetermined angle to the direction of thickness of the stimulable phosphor sheet, the stimulated emission can be detected more efficiently and an image further higher in S/N can be obtained.

BRIEF DESCRIPTION OF THE DRAWINGS

FIG. 7 is a perspective view showing a modification of the optical element array, FIG. 9 is a perspective view showing another modification of the optical element array, FIG. 10 is a schematic perspective view showing a part of a radiation image information read-out apparatus in accordance with another embodiment of the present invention, FIG. 12 is a view for illustrating the arrangement of the line sensor and the optical element array employed in the radiation image information read-out apparatus shown in FIG. 10, FIG. 13 is a fragmentary view showing a stimulable phosphor sheet suitable for radiation image information read-out apparatuses of the present invention.

DESCRIPTION OF THE PREFERRED EMBODIMENTS

Figure 1:
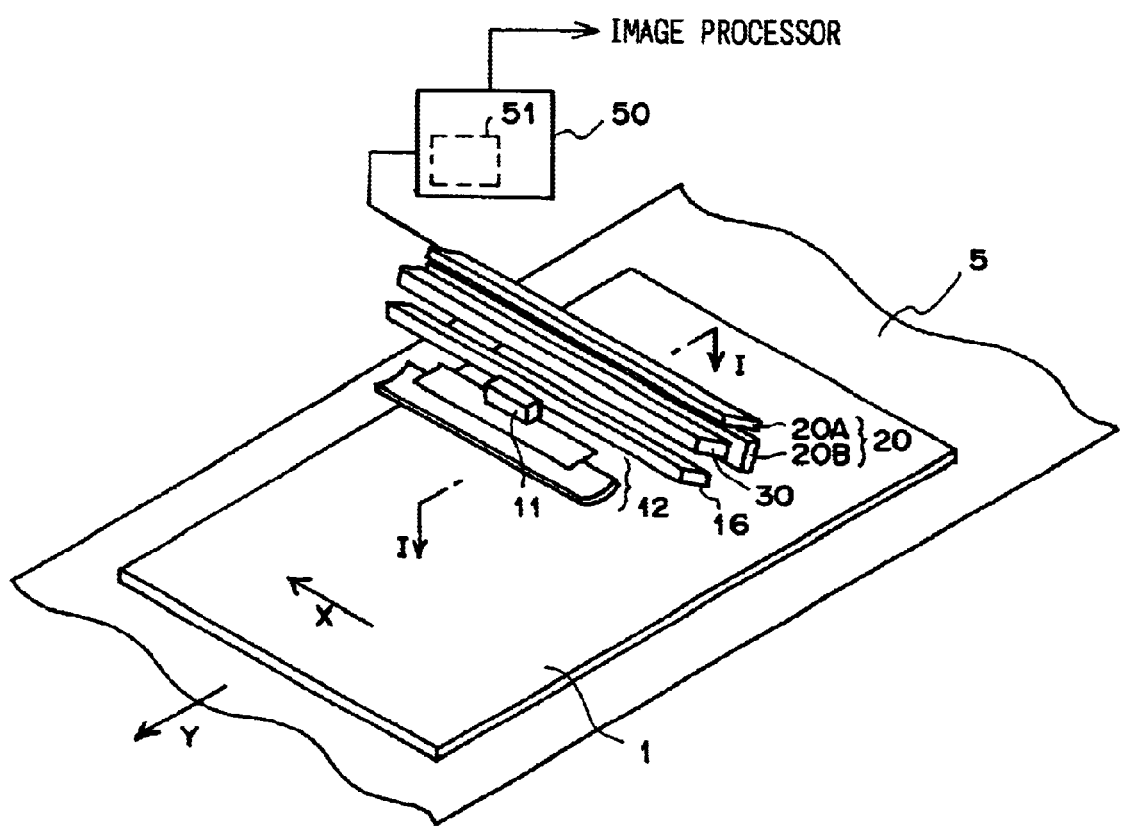
FIG. 1 is a schematic perspective view showing a part of a radiation image information read-out apparatus in accordance with an embodiment of the present invention.
Figure 2:
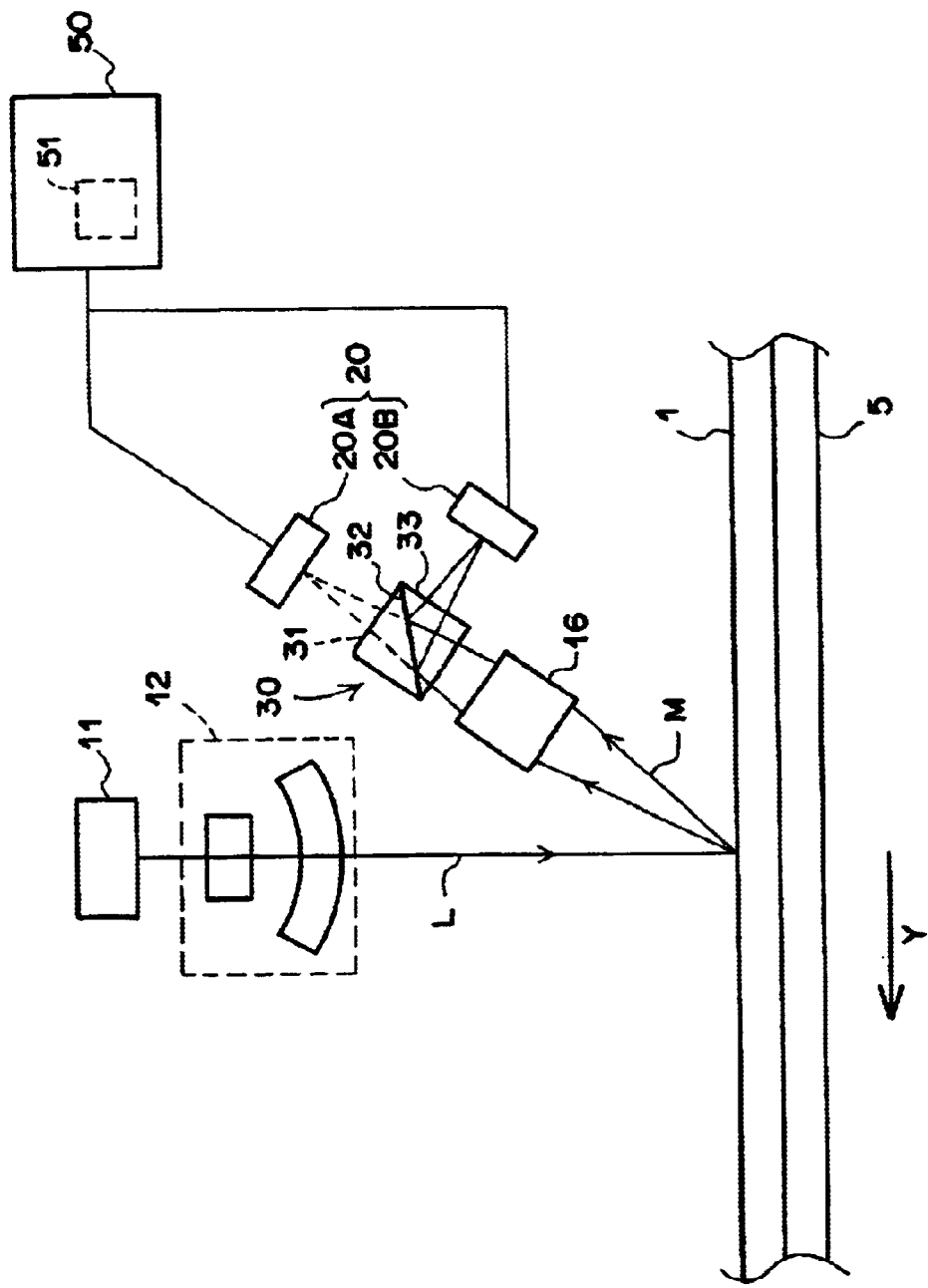
FIG. 2 is a cross-sectional view taken along line I—I in FIG. 1.

In FIGS. 1 and 2, a radiation image information read-out apparatus in accordance with an embodiment of the present invention comprises a sub-scanning belt 5 which conveys a stimulable phosphor sheet 1 storing thereon radiation image information in the direction of arrow Y (the sub-scanning direction), a stimulating light beam projecting means, a stimulated emission detecting means, and a signal processing means 50. The stimulating light beam projecting means comprises a broad area laser 11 which emits a secondary stimulating light beam L in perpendicular to the surface of the stimulable phosphor sheet 1 and an optical system 12 which is formed by a combination of a collimator lens which condenses the stimulating light beam L emitted from the broad area laser 11 and a toric lens which spreads the light beam only in one direction and causes the stimulating light beam L to impinge upon the surface of the stimulable phosphor sheet 1 in a pattern of a line. The stimulated emission detecting means comprises a refractive index profile type lens array 16 (an array of a plurality of refractive index profile type lenses such as a SELFOC lens array) which converges stimulated emission M emitted from the part of the stimulable phosphor sheet 1 exposed to the line stimulating light beam L onto a line sensor 20 to be described later, an optical element array 30 which receives the stimulated emission M passing through the lens array 16 and divides the stimulated emission M into first and second parts, and line sensor 20 consisting of a first sensor section 20A which receives the first part of the stimulated emission M and converts the amount of the first part of the stimulated emission M to a first electric signal and a second sensor section 20B which receives the second part of the stimulated emission M and converts the amount of the second part of the stimulated emission M to a second electric signal. The signal processing means 50 processes the first and second electric signals respectively output from the first and second sensor sections 20A and 20B of the line sensor 20. The optical element array 30 is formed of a material which cuts the stimulating light L.

The lens array 16 and the optical element array 30 are disposed so that the stimulated emission emitted from the part of the stimulable phosphor sheet 1 exposed to the line stimulating light beam L is uniformly received by the line sensor 20 over the entire width of the stimulable phosphor sheet 1.

The lens array 16 forms an erecting unit optical system and forms an image of the stimulated emission M on the light receiving face of each of the first and second sensor sections 20A and 20B in a natural size.

Figure 3:
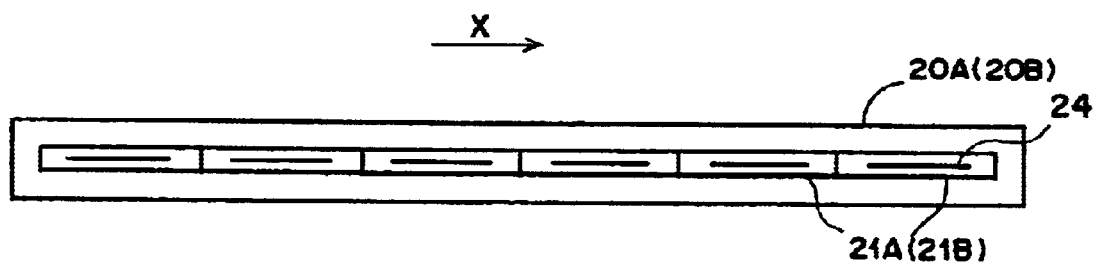
FIG. 3 is a schematic view showing one of the sensors forming the line sensor employed in the radiation image information read-out apparatus shown in FIG. 1.
Figure 4:
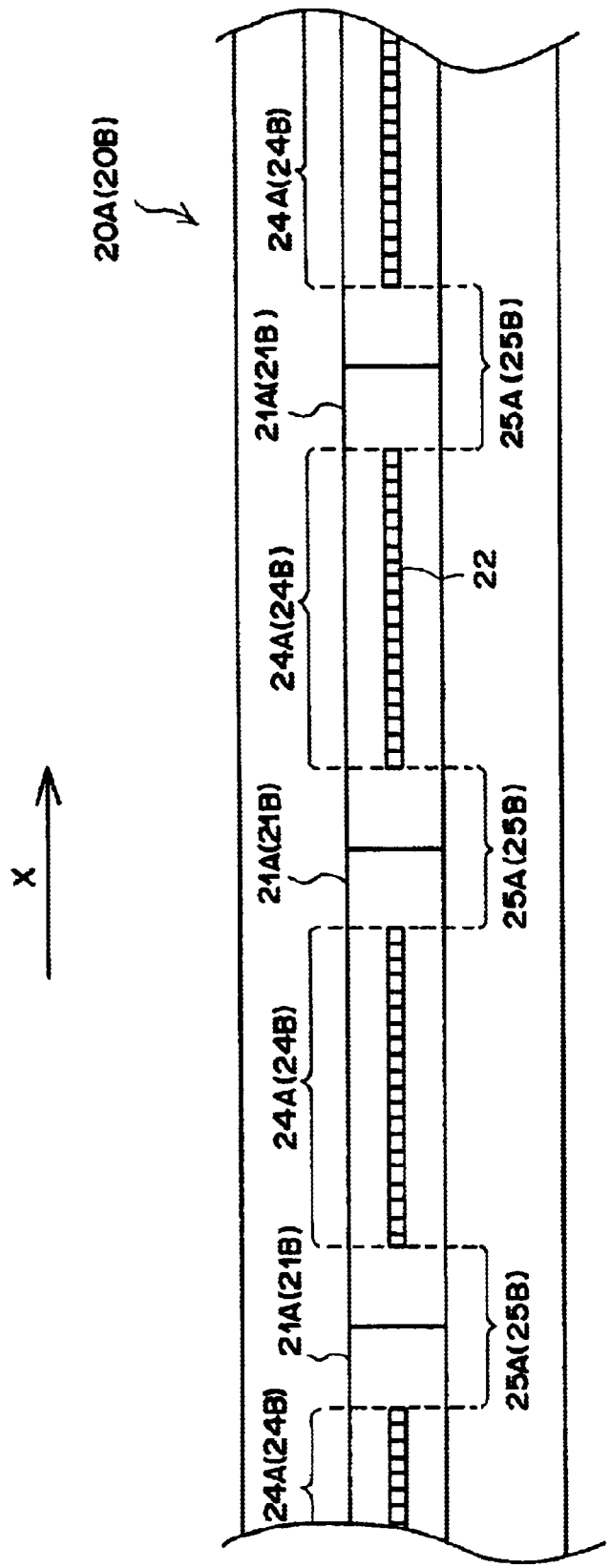
FIG. 4 is a fragmentary view showing in detail a part of the sensor shown in FIG. 3.

As shown in FIGS. 3 and 4, each of the sensor sections 20A (20B) comprises a plurality of sensor chips 21A (21B) arranged in a row in the direction of arrow X (the main scanning direction). The hatched portion 24A (24B) in each sensor chip 21A (21B) is an effective area which can sense light. In more detail, as shown in FIG. 4, the effective area 24A (24B) comprises an array of photoelectric convertor elements 22 extending in the main scanning direction, and the sensor chip 21A (21B) has noneffective areas on opposite ends of the effective area 24A (241B). The sensor section 20A (20B) is formed by connecting a plurality of such sensor chips 21A (21B) end to end, and accordingly, in the sensor section 20A (20B), the effective areas 24A (24B) and the noneffective areas 25A (25B) are alternately arranged in the main scanning direction X. The sensor chip 21A (21B) may be, for instance, an amorphous silicon sensor, a CCD sensor or a MOS image sensor.

Figure 5:
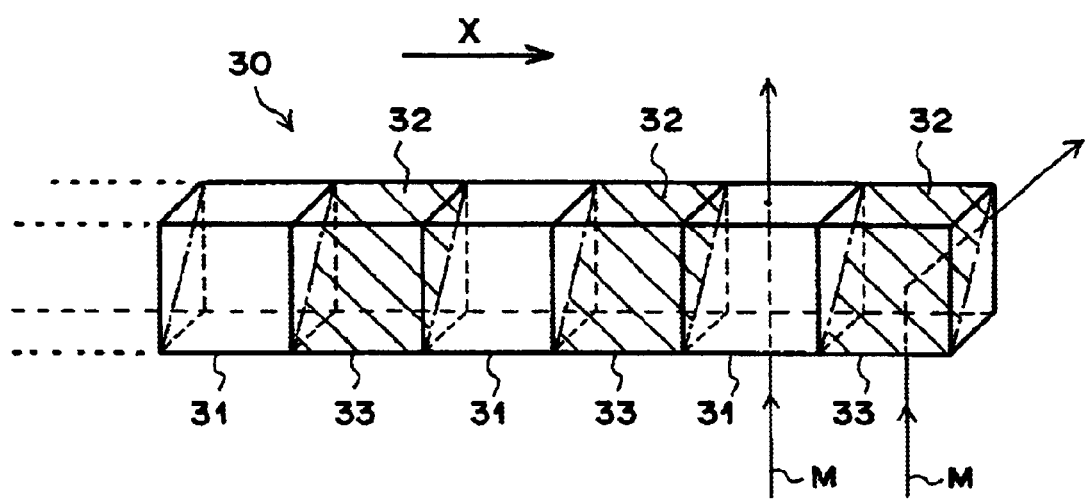
FIG. 5 is a perspective view showing the optical element array employed in the radiation image information read-out apparatus shown in FIG. 1.

As shown in FIG. 5, the optical element array 30 comprises a plurality of first optical elements 31 which transmit the stimulated emission M and a plurality of second optical elements 33 each having a reflecting surface which reflects the stimulated emission M so that each of the first optical elements 31 leads the stimulated emission to the first sensor section 20A and each of the second optical elements 33 leads the stimulated emission to the second sensor section 20B, the first and second optical elements 31 and 33 being alternately arranged in the main scanning direction X. The first and second sensor sections 20A and 20B are disposed with their respective effective areas 24A and 24B positioned to receive the stimulated emission led by the first and second optical elements 31 and 33, respectively.

Figure 6:
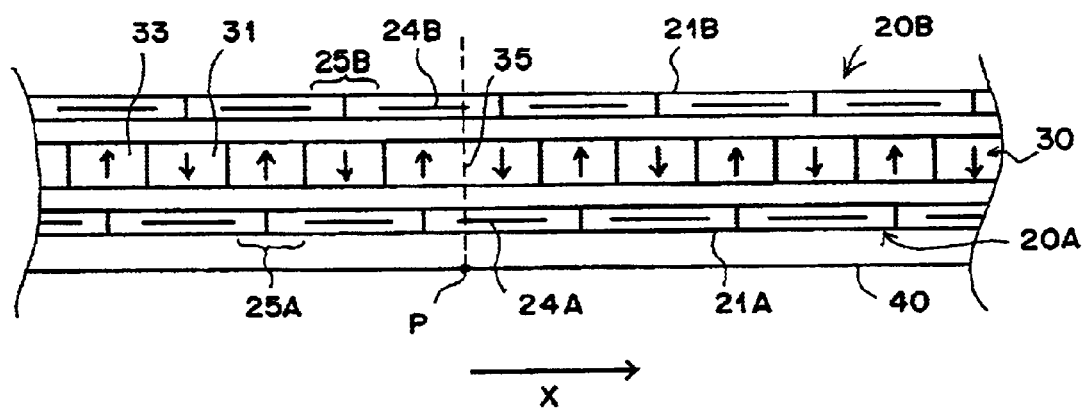
FIG. 6 is a view for illustrating the arrangement of the line sensor and the optical element array employed in the radiation image information read-out apparatus shown in FIG. 1.

FIG. 6 shows in more detail arrangement of the optical element array 30 relative to the first and second sensor sections 20A and 20B. In FIG. 6, arrows shown in the optical element array 30 indicate direction of travel of the stimulated emission M passing through the respective optical elements. That is, the first optical elements 31 lead the stimulated emission M to the first sensor section 20A and the second optical elements 33 lead the same to the second sensor section 20B. As described above, the first and second sensor sections 20A and 20B are disposed with their respective effective areas 24A and 24B positioned to receive the stimulated emission led by the first and second optical elements 31 and 33, respectively. Accordingly, the noneffective areas 25A of the first sensor section 20A and the noneffective areas 25B of the second sensor section 20B are alternately arranged in the main scanning direction X. With this arrangement, the parts of the stimulated emission M emitted from portions 40 of the stimulable phosphor sheet 1 corresponding to the noneffective areas of one of the sensor sections can be led to the effective areas of the other sensor section.

Further, the first and second sensor sections 20A and 20B are positioned so that the effective areas 24A of the first sensor section 20A partly overlap with the effective areas 24B of the first sensor section 20B in the main scanning direction X at parts corresponding to boundaries 35 between the first optical elements 31 and the second optical elements 33 of the optical element array 30.

The signal processing means 50 is provided with a pixel signal adder mean 51 and adds up the pixel signals, pixel by pixel, detected by the part of the effective areas 24A of the first sensor section 20A and the part of the effective areas 24B of the second sensor section 20B which overlap each other.

The operation of the radiation image information read-out apparatus of this embodiment will be described hereinbelow. The sub-scanning belt 5 conveys a stimulable phosphor sheet 1 storing thereon radiation image information in the sub-scanning direction Y at a constant speed. At the same time, a stimulating light beam L emitted from the broad area laser 11 is converted to a parallel beam by the optical system 12 comprising the collimator lens and the toric lens and is projected onto the stimulable phosphor sheet 1 to irradiate a line-like portion extending in the main scanning direction X over the entire width of the stimulable phosphor sheet 1.

The line-like irradiated portion of the stimulable phosphor sheet 1 exposed to the stimulating light beam L emits stimulated emission M in an amount proportional to the amount of radiation energy stored therein.

The stimulated emission M is led to the first and second sensor sections 20A and 20B of the line sensor 20 by the lens array 16 and the optical element array 30 and is photoelectrically detected by the first and second sensor sections 20A and 20B. Though the stimulated emission M reflected at the surface of the stimulable phosphor sheet 1 is in the stimulated emission M passing through the lens array 16 in a slight amount, such stimulated emission M is cut by the stimulating light cut filter of the optical element array 30 and cannot impinge upon the sensor sections 20A and 20B. Each photoelectric convertor elements 22 first and second sensor sections 20A and 20B converts the amount of the stimulated emission M (representing the radiation image information) into an analog electric signal S. The light detecting signal (analog electric signal) S is amplified and digitized by the signal processing means 50, and a digital image signal thus obtained is output to an image processor. The digital image signal is subjected to gradation processing and the like by the image processor and used to reproduce the radiation image recorded on the stimulable phosphor sheet 1.

Since the noneffective areas 25A of the first sensor section 20A and the noneffective areas 25B of the second sensor section 20B are alternately arranged in the main scanning direction X along the line-like irradiated portion 40 of the stimulable phosphor sheet 1 as shown in FIG. 6, the stimulated emission M emitted from the points in the irradiated portion 40 corresponding to the noneffective areas 25A of the first sensor section 20A is detected by the sensor chips 21B of the second sensor section 20B and the stimulated emission M emitted from the points in the irradiated portion 40 corresponding to the noneffective areas 25B of the second sensor section 20B is detected by the sensor chips 21A of the first sensor section 20A. The stimulated emission M emitted from the portion of the stimulable phosphor sheet 1 corresponding to the boundaries 35 between the first optical elements 31 and the second optical elements 33 of the optical element array 30 partly impinges upon one of the first and second optical elements 31 and 33 and partly impinges upon the other optical element and accordingly, is partly detected by one of the first and second sensor sections 20A and 20B and is partly detected by the other sensor section. However by adding the signals from the respective sensor sections 20A and 20B for each pixel by the pixel signal adder means 51 of the signal processing means 50, the stimulated emission M can be detected uniformly over all the pixels in irradiated portion 40 on the stimulable phosphor sheet 1.

Though, in the embodiment described above, the first optical elements 31 of the optical element array 30 transmits the stimulated emission M whereas the second optical elements 33 of the optical element array 30 reflects the same, the optical elements array 30 may be formed by first and second optical elements which both reflect the stimulated emission M. FIG. 7 shows an example of such an optical element array. The optical element array 60 shown in FIG. 7 comprises a plurality of first and second optical elements 62 and 64 which are alternately arranged in the main scanning direction X. Each of the first optical elements 62 has a reflecting surface 61 which reflects the stimulated emission M in a first direction, whereas each of the second optical elements 64 has a reflecting surface 63 which reflects the stimulated emission M in a second direction opposite to the first direction.

Figure 8:
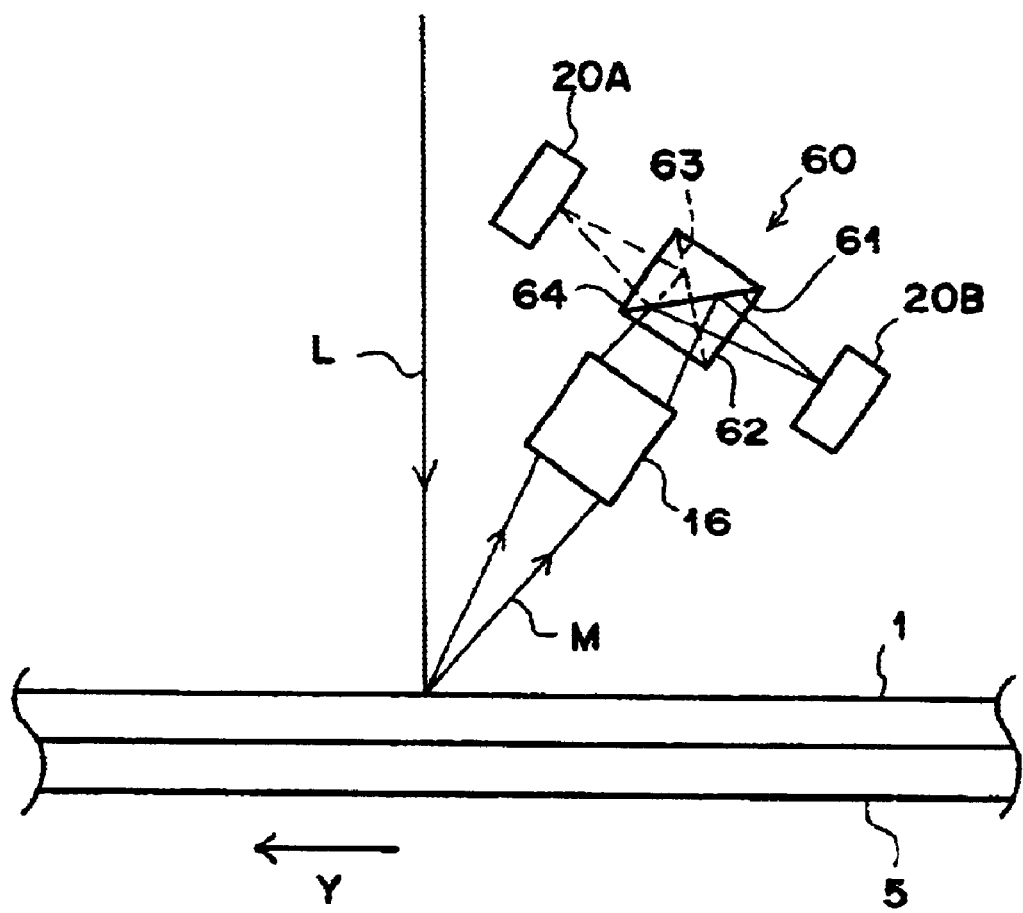
FIG. 8 is a schematic cross-sectional view showing a structure of a stimulated emission detecting means provided with the optical element array shown in FIG. 7.
Figure 11:
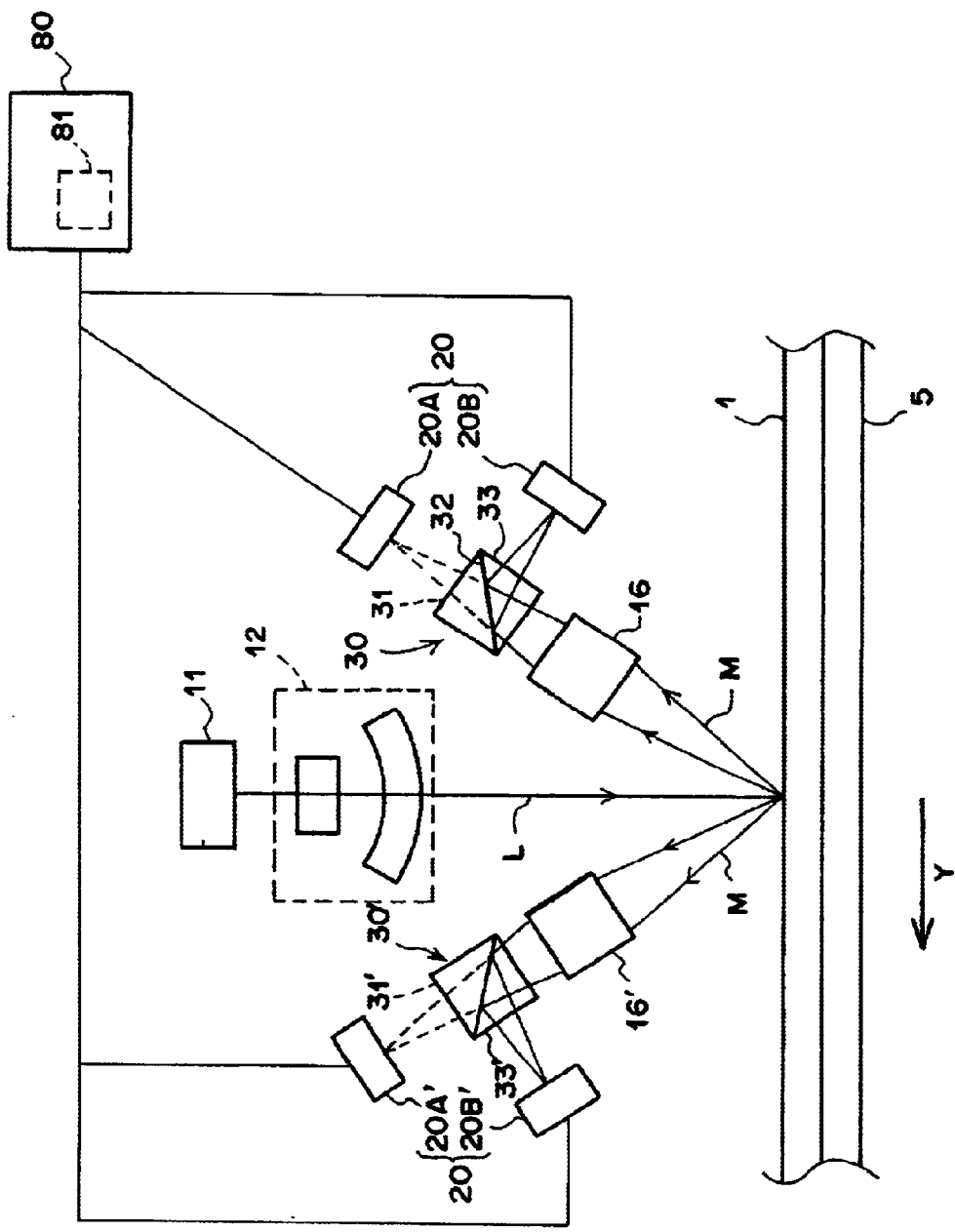
FIG. 11 is a cross-sectional view taken along line I—I in FIG. 10.

FIG. 8 is a fragmentary cross-sectional showing a radiation image information read-out apparatus employing the optical element array 60 shown in FIG. 7. As shown in FIG. 8, in this case, the first and second sensor sections 20A and 20B are symmetrically disposed on opposite sides of the optical element array 60. The stimulated emission M is divided into two parts by the optical element array 60, one of the two parts reflected to impinge upon the first sensor section 20A and the other reflected to impinge upon the second sensor section 20B.

It is preferred that the optical element array 60 doubles as a stimulating light cut filter. For example, the optical element array 60 may be formed by a material which absorbs the stimulating light beam L or each of the reflecting surface 61 and 63 of the first and second optical elements 62 and 64 may be formed as a dichroic mirror which reflects the stimulated emission M and transmits the stimulating light beam L.

Further, when the optical element array is formed by first and second optical elements 71 and 72 both having a reflecting surfaces, it is preferred that the reflecting surfaces of the first and second optical elements 71 and 72 partly overlap (75) each other in the main scanning direction at the boundaries between the reflecting surfaces of the first and second optical elements 71 and 72 as shown in FIG. 9. Without such overlapping portions 75, parts of the stimulated emission M impinging upon the boundaries go through the optical element array and can be received by neither the first sensor section 20A nor the second sensor section 20B. By providing such overlapping portions 75, the stimulated emission M emitted over the entire width of the stimulable phosphor sheet 1 in the main scanning direction can be detected.

Further, though, in the embodiments described above, the stimulated emission M is detected by a single set of stimulated emission detecting means, the stimulated emission M may be detected by the use of two or more sets of stimulated emission detecting means.

Now a radiation image information read-out apparatus in accordance with another embodiment of the present invention, where the stimulated emission M is detected by the use of two or more sets of stimulated emission detecting means will be described with reference to FIGS. 10 to 13, hereinbelow.

The radiation image information read-out apparatus of this embodiment differs from that of the preceding embodiment only in that an additional (second) stimulated emission detecting means is provided and accordingly the elements analogous to those in the preceding embodiments are given the same reference numerals and will not be described here. That is, the radiation image information read-out apparatus of this embodiment is further provided with a second stimulated emission detecting system comprising a refractive index profile type lens array 16' which converges stimulated emission M emitted from the part of the stimulable phosphor sheet 1 exposed to the line stimulating light beam L onto a line sensor 20', an optical element array 30' which receives the stimulated emission M passing through the lens array 16' through a stimulating light cut filter (not shown) which cuts the stimulating light L in the stimulated emission M passing through the lens array 16' and divides the stimulated emission M into first and second parts, and the line sensor 20' consisting of a first sensor section 20A' which receives the first part of the stimulated emission M and converts the amount of the first part of the stimulated emission M to a first electric signal and a second sensor section 20B' which receives the second part of the stimulated emission M and converts the amount of the second part of the stimulated emission M to a second electric signal. In place of the signal processing means 50 which processes the electric signals respectively output from the first and second sensor sections 20A and 20B of the line sensor 20, a signal processing means 80 which processes the electric signals respectively output from the first and second sensor sections 20A and 20B of the first line sensor 20 and the first and second sensor sections 20A' and 20B' of the second line sensor 20' is provided.

As shown in FIG. 12, the sensor chips 21A, 21B, 21A', and 21B' are arranged so that their noneffective areas 25A, 25B, 25A' and 25B' are positioned in different positions in the main scanning direction X and the parts of the stimulated emission M emitted from portions 40 of the stimulable phosphor sheet 1 corresponding to the noneffective areas of one of the sensor sections can be led to the effective areas of another sensor section. Further, the first and second optical element arrays 30 and 30A' are arranged so that the boundaries 35 between first and second optical elements in the first optical element array 30 are positioned in different positions from those 35' in the second optical element array 30' as seen in the main scanning direction, thereby suppressing discontinuity in data which can be caused near the boundaries of the optical elements.

The signal processing means 80 is provided with a pixel signal adder mean 81 and adds up the pixel signals, pixel by pixel, detected by the sensor sections 20A, 20B, 20A' and 20B' with the respective pixel signals multiplied by predetermined coefficients. Accordingly, data is prevented from being discontinuous at the noneffective areas 25A, 25B, 25A' and 25B' or the boundaries between optical elements in the optical element arrays 30 and 30', which results in a smooth image suppressed with artifact.

Further, since the first and second optical element arrays 30 and 30A' are arranged so that the boundaries 35 between optical elements in the first optical element array 30 are positioned in different positions from those 35' in the second optical element array 30' as seen in the main scanning direction, discontinuity in data which can be caused near the boundaries of the optical elements can be suppressed, whereby the stimulated emission M can be detected more uniformly over all the pixels in irradiated portion 40 on the stimulable phosphor sheet 1.

Further when two sets of stimulated emission detecting means are provided, light collecting efficiency is enhanced and an image higher in S/N can be obtained as compared with when only one set of stimulated emission detecting means is employed.

Though the stimulating light beam L need not be necessarily caused to impinge upon the stimulable phosphor sheet 1 in substantially perpendicular to the surface of the stimulable phosphor sheet 1 as in the embodiments described above, it is preferred that the optical system and the line sensor be disposed taking into account the light collecting efficiency when the stimulating light beam L is caused to obliquely impinge upon the surface of the stimulable phosphor sheet 1.

In the radiation image information read-out apparatus of this invention, it is especially preferred that the stimulable phosphor sheet be anisotropic. FIG. 13 shows an example of such an anisotropic stimulable phosphor sheet. The stimulable phosphor sheet 60 of this example comprises a support sheet 61 and a stimulable phosphor layer 62 formed on the support sheet 61. The stimulable phosphor layer 62 is partitioned into lots of fine cells by partitions 63 which are disposed at a predetermined angle α to the direction of thickness of the stimulable phosphor sheet 60 and reflect the stimulated emission M. When the stimulable phosphor sheet 60 with such a structure is employed, the stimulated emission M emitted from the portion of the stimulable phosphor sheet 60 exposed to the stimulating light beam L travels toward the surface of the stimulable phosphor sheet 60 repeatedly reflected by adjacent two partitions 63 and accordingly emanates from the stimulable phosphor sheet 60 without largely deviating from the direction in which the partitions 63 extend (the direction of anisotropy). Accordingly, by positioning the stimulated emission incident face 17 of the lens array 16 in perpendicular to the direction of anisotropy, the stimulated emission M is efficiently collected to the stimulated emission incident face 17, whereby the stimulated emission detecting efficiency can be enhanced and a high quality radiation image can be reproduced.

An anisotropic stimulable phosphor sheet can be also obtained by orienting prism crystal type stimulable phosphor so that the crystals are directed in the direction of thickness of the stimulable phosphor sheet and the stimulated emission M is repeatedly reflected between the crystal faces.

Further, in the present invention, the stimulable phosphor sheet may be that provided with both radiation absorbing function and radiation energy storing function or that provided with an energy storing phosphor layer in order to separate radiation absorbing function and radiation energy storing function from each other as disclosed in Japanese Patent Application No. 11 (1999)-372978. When the stimulable phosphor sheet with an energy storing phosphor layer is employed, detecting quantum efficiency, e.g., the radiation absorbance efficiency, stimulated emission emitting efficiency and stimulated emission taking out efficiency, is increased in total, whereby the radiation image quality can be improved.

Though, in the embodiments described above, the reading light projecting means is a line beam projecting means, the reading light projecting means may be of a point scan type which causes a point-like light beam to scan the stimulable phosphor sheet in the main scanning direction.

Figure 14:
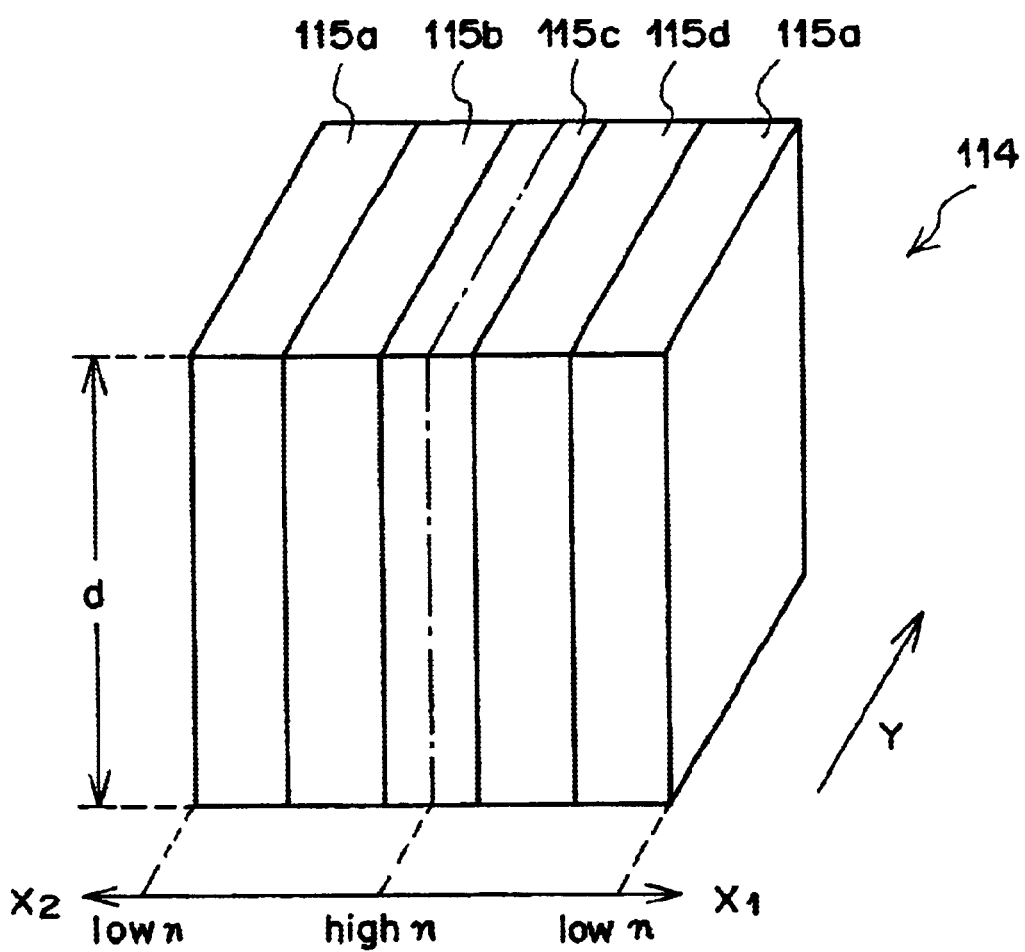
FIG. 14 is a perspective view showing a biaxial lens.
Figure 15:
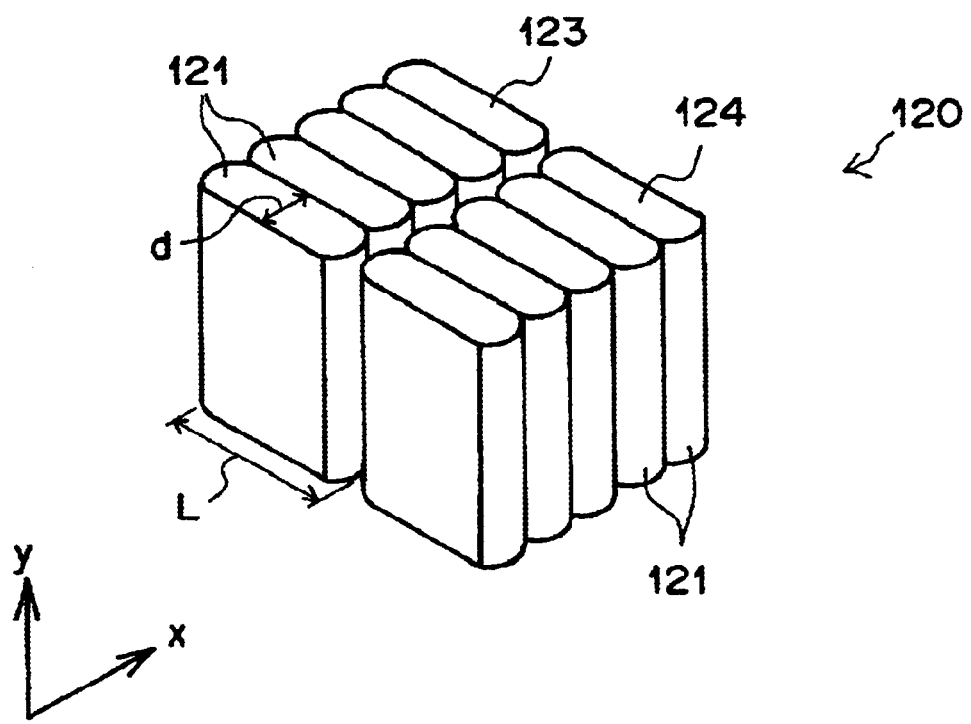
FIG. 15 is a perspective view showing an aspheric lens array.

Further, as the lens array 16, a biaxial lens array formed of a plurality of biaxial refractive index profile type lens elements or an aspheric lens array may be employed in place of the SELFOC lens. The biaxial refractive index profile type lens element is a lens element which is a rectangular prism in shape and whose refractive index is gradually reduced from the center of X-axis toward the ends X1 and X2 of X-axis as shown in FIG. 14. The biaxial refractive index profile type lens element 114a images in a different manners according to its length d. In this embodiment, the biaxial refractive index profile type lens element 114a forms an erecting unit optical system in the direction of the refractive index profile axis (X-axis). Since the biaxial refractive index profile type lens element 114a is formed by melting a plurality of sheets of glasses 115a, 115b, 115c ... 115d different in refractive index, the aperture and the refractive index difference between the central part and the ends can be freely set. For example, in this particular embodiment, the biaxial refractive index profile type lens element 114a is 1.83 in maximum refractive index $n_{max}$ and 1.52 in minimum refractive index $n_{min}$. This biaxial refractive index profile type lens element 114a has no refractive index gradient in the direction Y-axis. That is, the refractive index of the lens element 114a is uniform in the direction of Y-axis. The biaxial lens array is formed by arranging a plurality of such biaxial refractive index profile type lens elements 114a in the direction of refractive index profile (the direction of X-axis). Whereas the aspheric lens array is formed by arranging a plurality of aspheric lenses, each of which is longer in distance L between the cylindrical faces than the thickness d, in two rows 123 and 124 as shown in FIG. 15, and the two rows of lens arrays in which aspheric lenses 121 of the same shape are symmetrically arranged form an erecting unit optical system.

Though, in the embodiments described above, the present invention is described in conjunction with a radiation image information read-out apparatus for reading a radiation image from a stimulable phosphor sheet, the present invention can be applied to image reading in various systems including a fluorescence detecting system, an auto-radiography system, an electron microscope and a radiation diffraction detecting system. For example, when the present invention is to be applied to the fluorescence detecting system, reading light having a wavelength which can cause fluorescence pigment, used in causing the image-bearing medium to bear an image, to emit fluorescence is employed. Further, the image information read-out apparatus of the present invention can be employed as a scanner for, for instance, a copier in which a line light beam is projected onto a sheet such as a photographic film and an image on the sheet is read out on the basis of light reflected at the surface of the sheet.

What is claimed is:

1. An image read-out apparatus comprising a reading light projecting means which projects reading light in a line-like pattern extending in a main scanning direction onto an image-bearing medium bearing thereon image information, an image-bearing light detecting means having a line sensor which extends along the line-like portion of the image-bearing medium exposed to the reading light to receive image-bearing light emitted from the portion exposed to the reading light and converts the amount of image-bearing light to an electric signal, and a sub-scanning means which moves one of the image-bearing light detecting means and the image-bearing medium relatively to each other in a sub-scanning direction intersecting the main scanning direction, wherein the improvement comprises that the image-bearing light detecting means further comprises an erecting unit optical system which is disposed along the portion of the image-bearing medium exposed to the reading and focuses the image-bearing light on the line sensor and an optical element array formed by a plurality of first and second optical elements which are alternately arranged along the erecting unit optical system and lead the image-bearing light passing through the erecting unit optical system in different directions, and said line sensor comprises a first sensor which receives light led by the first optical elements and a second sensor which receives light led by the second optical elements.

2. An image information read-out apparatus as defined in claim 1 in which the image-bearing medium is a stimulable phosphor sheet on which radiation image information has been stored, and the image-bearing light is stimulated emission.

3. An image information read-out apparatus as defined in claim 2, in which the stimulable phosphor sheet is anisotropic and radiates the stimulated emission in a direction at a predetermined angle to the direction of thickness of the stimulable phosphor sheet, and the image-bearing light detecting system is arranged so that the stimulated emission incident face of the erecting unit optical system is positioned perpendicular to the direction at the predetermined angle to the direction of thickness of the stimulable phosphor sheet.

4. An image information read-out apparatus as defined in claim 1 in which the image-bearing medium bears thereon a fluorescent material image.

5. An image information read-out apparatus as defined in claim 1 in which each of the first and second sensors is provided with effective areas, where the sensor can detect light, and noneffective areas, where the sensor cannot detect light, which are alternately arranged in the main scanning direction, and the part of the image-bearing light led by the first optical elements is caused to impinge upon the effective areas of the first sensor and the part of the image-bearing light led by the second optical elements is caused to impinge upon the effective areas of the second sensor.

6. An image information read-out apparatus as defined in claim 1 in which the first and second sensors are disposed so that the effective areas of the first and second sensors overlap each other in the main scanning direction at portions corresponding to boundaries between the first and second optical elements of the optical element array and there is provided pixel signal adder means which adds up pixel by pixel outputs of the first and second sensors for each pixel in the portions corresponding to boundaries between the first and second optical elements of the optical element array.

7. An image information read-out apparatus as defined in claim 1 in which the first optical elements of the optical element array transmits the image-bearing light and each of the second optical elements has a reflecting surface which reflects the image-bearing light.

8. An image information read-out apparatus as defined in claim 7 in which said reflecting surface transmits the reading light.

9. An image information read-out apparatus as defined in claim 1 in which each of the first optical elements has a reflecting surface which reflects the image-bearing light in a first direction, and each of the second optical elements has a reflecting surface which reflects the image-bearing light in a second direction different from the first direction.

10. An image information read-out apparatus as defined in claim 1 in which the optical element array has a function of cutting the reading light.

11. An image information read-out apparatus as defined in claim 1 provided with a plurality of sets of image-bearing light detecting means.

12. An image information read-out apparatus as defined in claim 11, wherein first and second optical elements of the plurality of sets of image-bearing light detecting means are alternately arranged in the main scanning direction.

* * * * *